United States Patent Office 2,978,468
Patented Apr. 4, 1961

2,978,468

POLYMERIZATION, CONDENSATION AND REFINING OF FATTY ACIDS

Burt L. Hampton, Port St. Joe, Fla., assignor to The Glidden Company, Cleveland, Ohio, a corporation of Ohio No Drawing. Filed Sept. 23, 1957, Ser. No. 685,377

13 Claims. (Cl. 260—407)

My invention provides a method for polymerizing, condensing and refining fatty acids. My invention also provides a new composition or compositions of matter, and a method therefor. I have found that by employing certain preferred conditions and catalysts, to be described more fully hereinafter, I have succeeded in obtaining a novel composition(s) of matter, refined fatty acids and polymerization products.

An object of my invention is the provision of a novel polymerization process for unsaturated fatty acids or mixtures of saturated and unsaturated fatty acids.

Another object of my invention is the provision of a novel process for polymerizing and condensing fatty acids; for producing refined products from said polymerization process; for the removal of unwanted contaminants from fatty acids; and in general a process as hereinafter described that can be adapted to large scale operations. Other objects will be tendered hereinafter, or will be obvious from the description of the invention.

I have found that when unsaturated fatty acids or mixtures of saturated and unsaturated fatty acids are heated in the presence of a zinc halide and free hydrogen halide, a unique high boiling point material is produced. Additionally, I have found that by this process, unwanted contaminating material present in tall oil fatty acids, for example, such as residual sulfur, Liebermann-Storch positive reacting bodies which consist principally of rosin and probably phenolic bodies from lignin decomposition, are eliminated or substantally completely so.

Illustrative of unsaturated fatty acids, fatty acid-containing materials etc., applicable in the process of my invention are those derived from tall oil, soya oil, cottonseed oil, corn oil and the like. Presently, I prefer acids or mixtures thereof which are rich in oleic and linoleic acids. Exemplary of such an acid-mixture-containing material is tall oil fatty acid which contains approximately 50% oleic acid and 48% linoleic acid. Emphasis will be placed on the use of this fatty acid mixture in illustrating the process of my invention.

The catalyst found applicable in producing my unique compositions of matter are zinc halides in the presence of free hydrogen halides. Thus, I can employ in polymerization reactions of unsaturated fatty acid materials, a catalytic mixture consisting of zinc bromide and zinc chloride in the presence of free hydrogen chloride or bromide, or separately, zinc bromide or zinc chloride in the presence of free hydrogen chloride or bromide. I prefer to use a combination of zinc halide and hydrogen halide, more specifically, zinc chloride and free hydrogen chloride, since by this preferred aspect of my invention less colored products of higher acid number can be obtained.

Zinc chloride can be used alone under certain preferred conditions, as will be illustrated below. Also, zinc oxide can be used provided there is added enough halogen acid to react with the zinc oxide to yield the desired amount of zinc halide and free halogen acid. My invention also contemplates the use of chlorine or bromine in place of the free hydrogen halide, although the use of such elements is not preferred since they have a tendency to add to the fatty acid material to form larger quantities of organic halogen compounds and more stable organic halogen compounds than do the hydrogen halides thereby giving a positive Beilstein test for chlorine, for example, and a residue that is darker in color even after treatment by the improved treating process to be disclosed. In reward to the employment of free hydrogen chloride, it is to be noted that while I have obtained very satisfactory results by using dry hydrogen chloride, it is possible to tolerate small amounts of water. Aqueous hydrochloric acid does not give as good results as the dry acid and, accordingly, is not preferred.

As to the amount of catalysts, I have found that from about 1 to 2% of zinc halide in the presence of from about 1 to 2% of free hydrogen halide give optimum results. I have also found that I can employ lesser amounts of catalysts, but with an attendant reduction in the amounts of polymerized product. Nevertheless, I can use minor amounts of catalysts, say, from 0.1 to 0.5% zinc chloride or bromide in the presence of from 0.2 to 1% free hydrogen chloride or hydrogen bromide. Thus, it is to be noted, that in the preferred method of carrying out my polymerization reactions, I prefer to employ in addition to the zinc catalyst an excess of free hydrogen halide or, less preferably the halogen, in the order of from about 0.5 to 3 percent.

The temperatures that can be employed in the process of my invention are from approximately 110° C. to approximately 240° C. but I prefer temperatures of 130° C. to 180° C., for a period of time of from one to four hours. However, a time of from fifteen minutes to ten hours gives desirable results.

In one aspect of my invention I can carry out the polymerization reaction of unsaturated fatty acids by using a solvent for said acids. I can employ such solvents as xylene, toluene, mineral spirits, VPM naphtha or a similar naphtha and the like. When a solvent is used, I have found that good results are obtained if the concentration of the unsaturated fatty acid or mixture in the solvent is about 80 percent.

In another aspect of my invention, I can carry out the polymerization reaction of the unsaturated fatty acids without the use of a solvent therefor. Nevertheless, in this aspect, it has been found desirable to use a solvent in the washing step, as a better wash and a cleaner separation of the solution from the wash water is obtained. The solvent can be one of those used for the polymerization reaction.

The products obtained by the process of my invention are: (1) a volatile material comprising monomeric fatty acids and (2) a novel fatty acid polymer present in the nonvolatile portion of the product. The volatile material includes isomerized monomeric fatty acids, for example, isomerized oleic acid. Thus, my process is also adapable to the production of isomerization products of fatty acids. The novel polymer(s) of the process of my invention is formed by the addition of a fatty acid molecule, i.e., a carboxylic group, to a double bond of another fatty acid, or polymerized fatty acid, yielding a unique high boiling, viscous acidic material. Infrared spectrophotometry has proved, to my satisfaction, that this nonvolatile residue (under the conditions employed) comprises a novel composition of matter. The novel ester (or esters) formed is distinguishable from the known dimer acids or fatty acid anhydrides by infrared absorption data and other physical and chemical characteristics as will be indicated below. Thus, the acid number of the novel polymer acids of my invention is lower than in pure dimer or trimer acid, but the saponification number is high (185 to 190). Also, the low percent of unsaponifiables and neutral esters present in the residue, less than about 1%, and the high saponification number indicates that very little decarboxylation, if any, has occurred when optimum conditions of preparation are used. It is also probable that straight polymerized fatty acids with no condensed fatty acid on the molecule are present. It is also possible that three molecules of monomer condense to form an ester consisting of the addition of one molecule of acid to a dimer acid whose theoretical acid number would be two-thirds of the average acid number of the monomer acid and whose saponification number would be the same as that of the monomer acids.

The viscosity of the nonvolatile residue obtained can be varied over a considerable range without appreciably affecting the yield, by varying the amount of catalysts and the temperature of reaction.

The volatile acids obtained by the process of my invention are monomers rich in elaidic acid or trans-oleic acid, about 54% of trans acids, for example. They contain less than about 2% unsaponifiables if vacuum fractionated, and the lead oxide test for sulfur (heating about 2% lead oxide with fatty acid for 5 minutes and observation of lead sulfide formation, if any) is negative as indicated when the test is carried out at 300° C., as well as the Liebermann-Storch test for rosin when the low boiling unsaponifiables have been effectively removed, by operating under preferred conditions to produce maximum polymeric acids. The yield of volatile acids is around 52 to 55%, with an acid number of about from 192 to 194 and a saponification number of about 198, indicating, perhaps, the formation of a small amount of lactone or other esters.

The final reaction product containing the free halogen acid can be treated in accordance with the process described in my copending application Serial No. 685,376, now Patent No. 2,894,939 filed even date herewith. In that invention I have described the use of zinc dust or a bed of mossy zinc to obtain a product of superior quality. The zinc treatment accomplishes at least two important purposes: the fatty acid material recovered is of better quality than if the zinc treatment is omitted, and, more important to this invention, the zinc treatment is effective in removing hydrogen halide which has added on to the double bonds of the fatty acid materials.

When the zinc treatment is used, in accordance with my copending application above, it is desirable to use a dilute acid wash, followed by a water wash, in order to remove combined zinc. If this treatment is not practiced, the final product will have a higher ash content than is desirable. The dilute acids preferred are hydrochloric, sulfuric or phosphoric.

Whether a solvent has been used or not in the polymerization process of my invention, it is desirable to heat-treat the polymerized fatty acid product, after removal of the solvent if it is used, at from 250° to 280° C. in the presence of a small amount of steam for a period of about 10 minutes or more in order to remove residual halogen. This gentle steaming treatment removes residual halogen present in the product but is not as effective as when both the zinc treatment and steaming are employed. Obviously, therefore, the zinc treatment is desirable; such treatment reduces the tendency toward corrosion of processing equipment in the subsequent processing steps.

After the heat-treatment of the fatty acid polymerization-condensation product and mixtures thereof, the volatile acids are best removed continuously in a flash still at a vapor temperature of from about 185° to 210° C. with a pot temperature at about 210° to 240° C. or higher, at from 1 to 2 mm. pressure, with or without steam. The nonvolatile acids are removed continuously from the lower part of the still. However, a batch separation is practical, if desired.

In the following examples, which are offered as illustrative of my invention, FA-2 and Unitol ACD are trade names for commercial grades of tall oil fatty acids manufactured by Arizona Chemical Co. and Union Bag-Camp Corp., respectively. These are substantially similar products and the analyses are approximately as follows: Gardner color 5–6+; acid number 194; saponification number, 196; iodine number, 130; rosin acids, 1%; unsaponifiable, 2–2.4%; linoleic acid, about 48%; oleic acid, about 50%; saturated acid, about 2%.

*Example 1*

Five hundred grams of FA-2 was heated at 155–160° C. for 2.5 hours with 0.25% zinc chloride and 2.5% hydrogen chloride. Twelve grams of zinc dust was then added and stirring continued for 1 hour. The fatty acids were then decanted from the dust, diluted to about 45% concentration in toluene, washed with 6 grams of sulfuric acid in about 400 ml. of water and then finally washed twice with hot water. After removing the solvent to about 155° C. with steam, the product was heat-treated with gentle steaming at 275–285° C. for 10 minutes. The heat-treated acids were then distilled at 1–2 mm. The yield of non-volatile residue was 44%; acid number, 133; Gardner viscosity 25° C., Z–2—Z–3; Gardner color, 11–12.

*Example 2*

Five hundred grams of FA-2 was heated at 155° C. for 4 hours with 0.5% zinc chloride and 1.5% hydrogen chloride and then processed exactly as described in Example 1. The yield of nonvolatile residue was 46%, the acid number 134, the viscosity Z–2—Z–3 and the color, 10–11 Gardner.

*Example 3*

Five hundred grams of FA-2 was heated at 155–160° C. for 2.5 hours with 0.5% of zinc chloride and 2.1% hydrogen chloride and then processed as described in Example 1. The yield of nonvolatile residue was 46%, the acid number 143, the viscosity Z–2—Z–4 and the color 11 on the Gardner scale.

*Example 4*

Five hundred grams of FA-2 was dissolved in xylene and 3.0 grams of zinc oxide and 6 grams hydrogen chloride added at 148° to 150° C. The catalyst was equivalent to 1% zinc chloride plus 0.6% free hydrogen chloride based on the FA-2. The solution was heated at 148° to 150° C. for 4 hours and then thirty minutes in the presence of 10 grams of zinc dust with stirring. After diluting to 45% fatty acid concentration, the decanted solution was washed with dilute hydrochloric acid and, finally, with water. Further processing was as described in Example 1. Only traces of hydrogen chloride was found in the condensed water from the steam used to remove the solvent to a temperature of 200° C., while 0.87 g. was removed between 200° and 280° C. The Beilstein test for chlorine was negative for both the volatile and residual acids. The nonvolatile residue amounted to 38.2%; acid number, 116; Gardner viscosity 25° C., X; Gardner color, 10–11. The volatile acids obtained in the distillation at 1–2 mm. had a color of 2–3; acid number 194; viscosity, A. The Liebermann-Storch color reaction was barely perceptible, while it was very strong in the original FA-2. The lead oxide test for sulfur was negative.

*Example 5*

Five hundred grams of FA-2, Gardner color 6, was dissolved in 125 grams xylene and 4.5 grams zinc oxide, equivalent to 1.5% zinc chloride, and 10 grams hydrogen chloride, equivalent to 1.2% excess hydrogen chloride, were added at 147° to 151° C. and heating continued for 7 hours. After washing with dilute hydrochloric acid and water, the solvent was removed with steam to a pot temperature of 180° C. The product had a color of 8–9; Gardner viscosity Q; acid number, 165. The Beilstein test for chlorine was negative. If no zinc treatment is used, the test is strongly positive.

The product was distilled at 1–2 mm. and the volatile acids were recovered in 50.2% yield; color 1, acid number, 188. The Liebermann-Storch color reaction was barely perceptible and the lead oxide test for sulfur was negative.

The nonvolatile residue amounted to 48%, the acid number was 143, the saponification number 185, unsaponifiables 1%, color 10, viscosity Z-4—Z-5.

Example 6

Five hundred grams of FA-2 was heated at 160° C. for 3 hours with 1.5% zinc chloride and 1.2% hydrogen chloride. No metallic zinc treatment was used. Otherwise, further processing was as described in Example 1.

The nonvolatile residue (46.8%) had a color of 13 versus 9-11 where zinc dust treatment was used. The acid number was 151, the viscosity Z-6, saponification number 189, unsaponifiables 0.8%.

The water used during the steam-distillation to remove solvent and in the heat-treating step contained 5.13 grams of hydrochloric acid, approximately five times as much as when the zinc dust-treating step was included.

Example 7

Five hundred grams of Unitol ACD, 1.5% zinc chloride and 1.2% hydrogen chloride were heated at 170–176° C. for 2 hours. Ten grams of zinc dust was added and the reaction solution stirred for 1 hour. The product was then processed as described in Example 1.

The nonvolatile residue was obtained in 47.3% yield. The color was Gardner 12; acid number 152, viscosity Z-6, saponification number 189.5.

Example 8

Five hundred grams of FA-2 was heated at 155° to 165° C. with 1.5% zinc chloride and 3.0% hydrogen chloride for 2.5 hours. Twenty grams of zinc dust was then added and the matter stirred for 1 hour. The product was then processed as described in Example 1, except dilute hydrochloric acid was used to wash the solution.

The nonvolatile residue was recovered in 50% yield. The acid number was 155, saponification number 188, color 12-13, Gardner viscosity at 25° C. Z-6—Z-7.

The larger amount of hydrogen chloride used yielded a higher viscosity, darker product than when 1.2% hydrogen chloride was used and the infrared spectrum of the volatile acids indicated there was some lactone formation. This lactone was not present in observable quantities when smaller amounts (1.2%) hydrogen chloride was used.

Example 9

Five hundred grams of FA-2 was heated at 155° C. for 4 hours with 1.5% zinc chloride (generated in situ from an equivalent amount of zinc oxide and chlorine) and 1.2% chlorine. The product was then processed as described in Example 1.

The nonvolatile residue was obtained in 45% yield, the color was 13-14, acid number 148, saponification number 199, viscosity Z-5—Z-6. The color was not as good as when hydrogen chloride was used, although the zinc treating step was carried out in the same way.

The volatile acids were recovered in 54.5% yield and had a color of 2-3.

Example 10

Five hundred grams of Unitol ACD was heated at 155° to 160° C. with 1.5% zinc bromide and 2% hydrogen bromide for 2.5 hours and then stirred with zinc dust for 1 hour. The product was processed as described in Example 1. There was obtained 46.8% of nonvolatile acids which had an acid number of 145, a Gardner viscosity of Z-4 and a Gardner color of 9-10.

The infrared spectra of both the volatile and nonvolatile fractions were similar to those obtained from the zinc chloride-hydrogen chloride catalyzed products.

Example 11

In this example, Armour's Neofat 122 (soya oil, fatty acids) A.N. 196, color 5, linoleic acid 49%, palmitic 16%, stearic 4%, oleic 29%, linolenic 2%, was heated at 150° to 155° C. for 3 hours with 1.5% zinc chloride and 1.2% hydrogen chloride. The reaction product was then processed as described in Example 1, including the zinc dust treatment.

The nonvolatile fraction was recovered in 47% yield, the acid number was 159, the color 10, the viscosity Z-6. This soya-type oil yielded a nonvolatile fraction similar to that obtained from tall oil fatty acids.

Example 12

Three hundred grams of the methyl esters of FA-2 (acid number 6) was heated at 155° to 160° C. for 3 hours with 1.5% zinc chloride and 1.5% hydrogen chloride and then processed as described in Example 1.

The nonvolatile esters were obtained in 35.5% yield with a color of 14 and a Gardner viscosity of Q.

Example 13

Five hundred grams of FA-2 was heated at 160° C. for 3 hours with 1.5% zinc chloride and 1.2% hydrogen chloride and then poured into 3000 ml. of naphtha consisting principally of heptane.

A dark precipitate settled out of the solution on cooling to 30° C. which was filtered from the solution.

The solvent was then removed with steam to a pot temperature of 165° C. The product was then heat-treated with gentle steaming at 280° C. for 10 minutes. At this point the color was 9-10 and the acid number 173.

On distilling at 1-2 mm., a nonvolatile fraction was obtained in 45.7% yield. The acid number was 153, the color 11, the viscosity Z-5—Z-6 and the ash 0.19%.

By using this method of diluting the reaction product with naphtha and removing a probable zinc chloride addition product a fairly light colored product was obtained, but there was 5 grams of hydrogen chloride broken out on heat-treating, whereas, approximately one-fifth of this amount is broken out where the zinc dust treating step is used.

Example 14

A fraction substantially nonvolatile at 1 to 2 mm. pressure with a viscosity of Z-2 obtained by the action of zinc chloride and hydrogen chloride on FA-2 was subjected to a molecular distillation and the results recorded in the following table.

TABLE 1

[Charge 230 grams]

| Cycle | Collection Temp., °C. | Pressure, Microns | Weight, Grams | Acid No. | Sap. No. | Gardner Viscosity |
|---|---|---|---|---|---|---|
| 1 | 80 | 15-16 | 2.67 | | | |
| 2 | 90 | 14-15 | 2.19 | | | |
| 3 | 100 | 15 | 2.54 | | | |
| 4 | 120 | 16 | 1.91 | | | |
| 5 | 150 | 16 | 24.78 | 125 | 197 | R. |
| 6 | 160 | 16 | 27.65 | 130.4 | | U. |
| 7 | 160 | 16 | 14.88 | 134.6 | | V. |
| 8 | 180 | 16 | 24.78 | 144.6 | | |
| 9 | 180 | 16 | 7.93 | | | X-Y. |
| 10 | 200 | 16 | 26.30 | 145 | | Z-3—Z-4. |
| 11 | 200 | 16 | 10.46 | 147 | | |
| 12 | 210 | 18 | 14.01 | 152 | 195 | Z-5—Z-6. |
| 13 | Residue | | 50.00 | 126 | 191 | Dark Brown Viscous Oil. |
| Total | | | 209.70 | | | |

The high viscosity of the residue prevented drainage from the still and is responsible for the poor material balance.

The small amount of low boiling material in the earlier fractions is largely unchanged monomeric fatty acid not removed during the original fractionation at 1–2 mm. The infrared spectra of each fraction from 5 through 13 shows the presence of considerable amounts of ester-acid. There is not a clean separation of products, but from the infrared spectra, acid numbers, saponification numbers and viscosities, the product is a mixture of compounds formed by the addition of monomeric acids to the double bonds of monomeric acids, dimeric acids and possibly trimeric acids forming acid-esters through a process of polymerization and condensation.

The ultraviolet and infrared analyses of the acids volatile at 1 to 2 mm. pressure obtained in the same process as described for obtaining the nonvolatile product of Z–2 viscosity show that the process causes considerable elaidinization. A typical analysis is as follows: Acid number 192, Gardner color 1, 1.2% unsaponifiables, conjugated diene 1.05%, conjugated triene, 5.26%, trans acid 54% and iodine value 98.8.

*Example 15*

Five hundred grams of FA–2 and 15 grams of zinc chloride were heated at 155° C. for 4 hours. After diluting to 45% fatty acid concentration with toluene, the solution was washed with dilute hydrochloric acid and finally with water. The solvent was removed and the product heat-treated at 280° C. for 10 minutes with gentle steaming. These heat-treated acids were then distilled at 1–2 mm., yielding 52.5% of volatile acids of color 5 and acid number 192. The nonvolatile residue amounted to 47% and had an acid number of 132 and a color of 13–14. The Gardner viscosity at 24° C. was Z–1—Z–2.

The infrared spectrum of the nonvolatile fraction indicated that the product was similar to that obtained in the reaction where about 1% of zinc chloride and 0.6–1% hydrogen chloride was used. The infrared spectrum of the volatile acids also showed considerable elaidinization.

*Example 16*

Five hundred grams of FA–2 was heated with 3.0% of zinc chloride at 205° to 212° C. for 2 hours, under carbon dioxide. The product was dissolved in toluene, washed with dilute hydrochloric acid and with water. The solvent was removed to a pot temperature of 170° C. The color was 18, the viscosity N–0, the acid number 164. The infrared spectrum was similar to that of the product obtained using 3% of zinc chloride at 155° C. but the higher temperature caused the product to be much darker.

The zinc chloride treatment alone is effective in removing sulfur, but not as effective as a combination of zinc chloride and hydrogen chloride in removing Liebermann-Storch positive reacting bodies.

Infrared studies of the nonvolatile fractions proved that an ester is present in these polymer acids, thereby accounting for the lowered acid number and higher saponification number. This ester formation, as mentioned, is due to the addition of a carboxylic group to a double bond.

*Example 17*

Two gallon samples of different viscosity polymers were prepared: one with a viscosity of Z–4—Z–5, acid number 151, saponification number 189, less than 1% unsaponifiables and a color of 12 Gardner, by employing 1.5% zinc chloride and 1.2% hydrogen chloride at 155° C.; and the other with a viscosity of Z–2, acid number 130, saponification number 187 and a color of 10–11 Gardner, by employing 1% zinc chloride and 1% hydrogen chloride at 155° C.

Samples of both of these polymers were used to prepare methyl esters thereof by known procedures. When these materials were heated at 270° C. under 2 mm. vacuum, they yielded very little volatile esters.

Another two samples of these polymers were then subjected to infrared analysis with the result that the ester linkage gave an infrared absorption at $5.81/\mu$. The carboxyl absorption was at $5.90/\mu$. A comparison of these wave lengths with those of the anhydride of tall oil fatty acids (prepared by acetic anhydride treatment, followed by distilling off the acetic acid), showed the true anhydride absorption located at 5.68 and $5.47/\mu$ which is readily distinguishable from the values quoted above for the ester and carboxyl group.

Although I have indicated the use of several unsaturated and/or mixtures of unsaturated and saturated fatty acids in the process of my invention, it should be understood that I can also use the alkyl esters of these acids, for example, the methyl esters (see Example 12). However, the use of the methyl esters as feed stock does not result in as high a yield of novel polymer as with the free fatty acids, since the methyl esters have low free acids, with the consequence that very little ester formation due to condensation of the free fatty acids occurs.

The novel polymers of my invention are of value in the manufacture of alkyd resins, polyamide resins, adhesives, emulsifying agents, plasticizers and soaps. Moreover, the polymers formed can also be used in admixture with the volatile acids for the manufacture of alkyd resins. We have found that such resins possess many desirable properties. Also, other uses include: linseed oil substitutes, lube oil additives and the like.

Having thus described my invention, I claim:

1. A process for treating a mixture of unsaturated fatty acids rich in oleic and linoleic acids which essentially comprises heating said mixture at a temperature of from about 110° to about 240° C. with a catalytic quantity of a catalyst selected from the group consisting of zinc chloride, zinc bromide and mixtures thereof in admixture with a catalytic quantity of an acid catalyst selected from the group consisting of hydrogen chloride and hydrogen bromide, recovering from said treatment a polymerized product, said polymerized product including the product formed by the reaction of a carboxylic acid group of a fatty acid molecule with a double bond of another fatty acid.

2. A process according to claim 1 wherein the zinc chloride catalyst is formed in situ by the reaction of zinc oxide with hydrogen chloride.

3. A process according to claim 1 wherein the quantity of catalyst is from 0.1 to 2% of zinc chloride and from 0.2 to 2% of hydrogen chloride.

4. The process of claim 1 wherein the catalyst is zinc chloride and the acid is hydrogen chloride.

5. A process for preparing a mixture of polymerized fatty acids including the product formed by the reaction of a carboxylic acid group of a fatty acid molecule with a double bond of another fatty acid which essentially comprises heating a mixture of unsaturated fatty acids rich in oleic and linoleic acids at a temperature of from about 110° C. to about 240° C. in the presence of a catalytic quantity of a catalyst selected from the group consisting of zinc chloride, zinc bromide and mixtures thereof in admixture with a catalytic quantity of a catalyst selected from the group consisting of chlorine and bromine.

6. A process for preparing a mixture of polymerized fatty acids including the product formed by the reaction of a carboxylic acid group of a fatty acid molecule with a double bond of another fatty acid which essentially comprises heating a mixture of unsaturated fatty acids rich in oleic and linoleic acids at a temperature of from about 110° to about 240° C. with catalytic quantity of zinc chloride.

7. A process for treating a mixture of unsaturated fatty acids rich in oleic and linoleic acids which essentially comprises heating said mixture at a temperature of from about 110° to 240° C. with a catalytic quantity of a catalyst selected from the group consisting of zinc chloride, zinc bromide and mixtures thereof in admixture with a catalytic quantity of an acid catalyst selected from the group consisting of hydrogen chloride and hydrogen bromide, treating the resulting product with steam at a temperature of from 250° to 280° C., and recovering therefrom monomeric and polymerized fatty acids, said polymerized fatty acids including the product formed by the reaction of a carboxylic acid group of a fatty acid with the double bond of another fatty acid.

8. An addition ester of an unsaturated acid selected from the group consisting of oleic and linoleic acids with an unsaturated acid selected from the group consisting of oleic and linoleic acids, said ester having been prepared by heating a mixture of unsaturated fatty acids rich in oleic and linoleic acids at a temperature of from about 110° to 240° C. with a catalyic quantity of a catalyst selected from the group consisting of zinc chloride, zinc bromide and mixtures thereof in admixture with a catalytic quantity of an acid catalyst selected from the group consisting of hydrogen chloride and hydrogen bromide.

9. An addition ester of an unsaturated acid selected from the group consisting of oleic, and linoleic acids with an unsaturated acid selected from the group consisting of oleic, linoleic and polymerized oleic and linoleic acids, said ester having been prepared by heating a mixture of unsaturated fatty acids rich in oleic and linoleic acids at a temperature of from about 110° to 240° C. with a catalytic quantity of a catalyst selected from the group consisting of zinc chloride, zinc bromide and mixtures thereof in admixture with a catalytic quantity of an acid catalyst selected from the group consisting of hydrogen chloride and hydrogen bromide.

10. The process of claim 1 wherein the mixture of unsaturated fatty acids treated is a tall oil fatty acid.

11. The process of claim 1 wherein the mixture of unsaturated fatty acids treated is a soya oil fatty acid.

12. A process according to claim 1 wherein the zinc bromide catalyst is formed in situ by the reaction of zinc oxide with hydrogen bromide.

13. A process according to claim 1 wherein the quantity of catalyst is from about 0.1 to 2% of zinc bromide and from 0.2 to 2% of hydrogen bromide.

References Cited in the file of this patent
UNITED STATES PATENTS

| | | |
|---|---|---|
| 2,326,748 | Brown et al. | Aug. 17, 1943 |
| 2,478,451 | Berger et al. | Aug. 9, 1949 |
| 2,632,695 | Landis et al. | Mar. 24, 1953 |
| 2,670,361 | Croston et al. | Feb. 23, 1954 |
| 2,793,220 | Barrett et al. | May 21, 1957 |

OTHER REFERENCES

Surrey: Name Reactions in Organic Chemistry, page 73 (1954), Academic Press Inc., Publishers, New York.